(12) United States Patent
Sodhi et al.

(10) Patent No.: US 10,480,278 B1
(45) Date of Patent: Nov. 19, 2019

(54) CEMENT SPACER FLUID COMPRISING QUATERNARY SURFACTANT, VISCOSIFIER, AND PROPPANT

(71) Applicants: Thomas S. Sodhi, New Caney, TX (US); Shannon E. Bryant, Tomball, TX (US)

(72) Inventors: Thomas S. Sodhi, New Caney, TX (US); Shannon E. Bryant, Tomball, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/023,155

(22) Filed: Jun. 29, 2018

(51) Int. Cl.
*E21B 33/13* (2006.01)
*C09K 8/40* (2006.01)
*C09K 8/42* (2006.01)
*C09K 8/80* (2006.01)

(52) U.S. Cl.
CPC ............. *E21B 33/13* (2013.01); *C09K 8/40* (2013.01); *C09K 8/424* (2013.01); *C09K 8/80* (2013.01); *C09K 2208/06* (2013.01)

(58) Field of Classification Search
CPC ........... E21B 33/13; C09K 8/40; C09K 8/424; C09K 8/80; C09K 2208/06
See application file for complete search history.

(56) References Cited

U.S. PATENT DOCUMENTS

| | | | |
|---|---|---|---|
| 9,650,559 B2 * | 5/2017 | Nelson | C09K 8/40 |
| 9,951,261 B2 * | 4/2018 | Nelson | C09K 8/424 |
| 9,994,756 B2 * | 6/2018 | Nelson | C09K 8/12 |
| 2016/0264837 A1 * | 9/2016 | Nelson | C09K 8/12 |
| 2016/0264838 A1 * | 9/2016 | Nelson | C09K 8/424 |
| 2016/0265306 A1 * | 9/2016 | Nelson | C09K 8/40 |
| 2018/0298272 A1 * | 10/2018 | Qu | C09K 8/80 |

* cited by examiner

*Primary Examiner* — Zakiya W Bates
*Assistant Examiner* — Crystal J Miller
(74) *Attorney, Agent, or Firm* — Cantor Colburn LLP

(57) ABSTRACT

A method of cementing a wellbore penetrating a subterranean formation comprises: injecting into the wellbore a cement spacer fluid comprising a carrier fluid, a quaternary surfactant, a viscosifier, and a proppant; injecting a cement slurry into the wellbore; and allowing the cement slurry to set.

18 Claims, No Drawings

CEMENT SPACER FLUID COMPRISING QUATERNARY SURFACTANT, VISCOSIFIER, AND PROPPANT

BACKGROUND

Plugging oil or gas wells with a cement plug is a common operation in the art. In general, one of the goals of plug cementing is to secure a stable and effective seal in a designated location of the wellbore. In other cases, a cement plug may be used to provide a base for initiating a derivation or kick-off when a directional change in drilling is desired.

Cement plugs are often constructed by pumping a cement slurry down a drill pipe. The pumped cement slurry then displaces a wellbore fluid such as a drilling fluid, and hardens forming a cement plug. Because a cement slurry is usually denser than a drilling fluid, the lighter drilling fluid tends to migrate upward and through the cement slurry. At the same time, the heavier cement slurry tends to fall in the wellbore as it sets up. This phenomenon is known as density swapping of fluids within the wellbore. Density swapping can ultimately lead to the plug failing to set in its intended place, and the subsequent mixing of wellbore fluids with the plug slurry can also have detrimental effects on the intended performance of the set cement.

Cement spacers can be used to aid separating drilling fluids from cement slurries. However, some known cement spacers are not entirely effective, and allow mixing and remixing of the fluids that they are designed to separate. Contamination of the cement slurries can slow or prevent setting or otherwise comprise the integrity of the cement plug. Accordingly, there remains a need in the art for alternative cement spacer fluids and methods of cementing a wellbore using the alternative cement spacer fluids.

BRIEF DESCRIPTION

A method of cementing a wellbore penetrating a subterranean formation comprises: injecting into the wellbore a cement spacer fluid comprising a carrier fluid, a quaternary surfactant, a viscosifier, and a proppant; injecting a cement slurry into the wellbore; and allowing the cement slurry to set.

A cement spacer fluid comprises about 30 to about 100 wt % of an aqueous carrier comprising water or brine; about 0.05 to about 10 wt % of a quaternary surfactant having a cation of $R_1 R_2 R_3 R_4 N^+$ and an anion, wherein $R_1$, $R_2$, $R_3$, and $R_4$ are each independently a straight or branched $C_{1-30}$ alkyl group, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, or a polyoxyalkylene group; and the anion comprises a halide, a perchlorate, a thiocyanate, a cyanate, a carboxylate, an alkyl sulfate, an alkyl sulfonate, $PF_6^-$, $AsF_6^-$, $SbF_6^-$, $NO_2^-$, $NO_3^-$, $SO_4^-$, or $BX_4^-$, X being a halide; about 0.05 to about 10 wt % of a viscosifier; and about 1 to about 65 wt % of a proppant, each based on the weight of water in the cement spacer fluid.

DETAILED DESCRIPTION

An improved method for cementing a wellbore is disclosed. The method uses a cement spacer fluid comprising a carrier fluid, a quaternary surfactant, a viscosifier, and a proppant to minimize density swapping between a cement slurry and a wellbore fluid such as a drilling fluid. In particular, the spacer fluid a low enough density to suspend itself on top of the wellbore fluid. In addition, the spacer fluid becomes a gel once injected downhole. The gel has a strong enough structure to support the cement slurry. Thus, the cement spacer fluid can effectively minimize density swapping between the cement slurry and the wellbore fluid.

The quaternary surfactant has a cation of $R_1 R_2 R_3 R_4 N^+$ and an anion, wherein $R_1$, $R_2$, $R_3$, and $R_4$ are each independently a straight or branched $C_{1-30}$ alkyl group, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, or a polyoxyalkylene group; and the anion comprises a halide, a perchlorate, a thiocyanate, a cyanate, a carboxylate, an alkyl sulfate, an alkyl sulfonate, $PF_6^-$, $AsF_6^-$, $SbF_6^-$, $NO_2^-$, $NO_3^-$, $SO_4^-$, or $BX_4^-$, wherein X is a halide. Quaternary surfactants having a halide or a methyl sulfate anion are specifically mentioned.

As used herein, the term "chloride" includes —F, —Cl, —Br, or —I; "alkyl" refers to a straight or branched chain, saturated monovalent hydrocarbon group regardless whether straight or branched chain is specifically mentioned or not; "aryl" refers to an aromatic monovalent group containing only carbon in the aromatic ring or rings; "arylalkyl" refers to an alkyl group that has been substituted with an aryl group, with benzyl being an exemplary arylalkyl group; "alkylbenzyl" refers to a benzyl group that has been substituted with an alkyl group in the aromatic ring; "hydroxyalkyl" refers to an alkyl group that has been substituted with a hydroxyl group with 2-hydroxyethyl as an exemplary hydroxyalkyl group; "hydroxyalkylbenzyl" refers to a benzyl group that has been substituted with a hydroxyalkyl group as defined herein in the aromatic ring; "alkylene" refers to a straight or branched chain, saturated, divalent hydrocarbon group, and "alkenyl" refers to a straight or branched chain monovalent hydrocarbon group having at least two carbons joined by a carbon-carbon double bond. The term "substituted" as used herein means that at least one hydrogen on the designated atom or group is replaced with another group, provided that the designated atom's normal valence is not exceeded. Substituted with a group means substituted with one or more groups.

As used herein, a polyoxyalkylene group has a formula

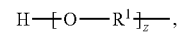

where each occurrence of $R^1$ is independently a $C_{1-10}$ alkylene or $C_{2-8}$ alkylene, specifically ethylene, propylene, butylene, or a combination thereof, and z is an integer greater than 1 such as 2 to 30, 4 to 25, or 8 to 25.

In an embodiment, $R_1$, $R_2$, $R_3$, and $R_4$ are each independently a straight or branched $C_{1-20}$ alkyl group or a $C_{1-20}$ hydroxyalkyl group, preferably $R_1$, $R_2$, $R_3$, and $R_4$ are each independently a straight or branched $C_{1-10}$ alkyl group or a $C_{1-10}$ hydroxyalkyl group, more preferably, $R_1$, $R_2$, $R_3$, and $R_4$ are each independently a straight or branched $C_{1-5}$ alkyl group or a $C_{1-5}$ hydroxyalkyl group.

In an embodiment, at least one of $R_1$, $R_2$, $R_3$, and $R_4$ is a $C_{1-5}$ hydroxyalkyl group. Preferably, $R_1$, $R_2$, and $R_3$ are each independently a $C_{1-5}$ hydroxyalkyl group, and $R_4$ is a straight or branched $C_{1-5}$ alkyl group, or $R_1$, $R_2$, and $R_3$ are each independently a straight or branched $C_{1-5}$ alkyl group, and $R_4$ is a $C_{1-5}$ hydroxyalkyl group.

In a specific exemplary embodiment, the quaternary surfactant is a quaternary ammonium salt like choline chloride and preferably contains the N,N,N-trimethylethanolammonium cation. Such quaternary ammonium salts include Claytreat-3C clay stabilizer (CT-3C) or Claymaster-5C both by Baker Hughes, a GE company, LLC.

The spacer fluids can contain about 0.1 to 50 pounds of the quaternary surfactant per gallon of the spacer fluids (ppg), preferably about 1 to about 25 ppg, more preferably about 2 to about 12.5 ppg of the quaternary surfactant.

In addition to quaternary surfactant, cement spacer fluids can further comprise a viscosifier. The viscosifier can be a natural polymers such as guar gums, guar derivatives such as hydropropyl guar (HPG), carboxymethyl guar (CMG), and carboxymethylhydroxypropyl guar (CMHPG), high-molecular weight, hydratable polysaccharides, xanthan gum (which can optionally be crosslinked), galactomannan gums, glucomannan gums, cellulose, cellulose derivatives such as hydroxyethylcellulose (HEC), carboxymethylcellulose (CMC), hydroxypropylcellulose (HPC), and carboxymethylhydroxyethylcellulose (CMHEC); synthetic polymers such as poly((meth)acrylic acid)s, poly((meth)acrylamides), copolymers of (meth)acrylic acid and (meth)acrylamide, and $C_{1-8}$ alkyl poly(meth)acrylates; or clays such as bentonite, sepiolite, and attapulgite, and the like; or a combination comprising at least one of the foregoing viscosifiers.

The cement spacer fluids can contain about 0.01 to 65 pounds of the viscosifier per gallon of the cement spacer fluids (ppg), preferably about 0.1 to about 30 ppg, more preferably about 1 to about 10 ppg of the viscosifier.

The cement spacer fluids further include a proppant. The inventors have found that the presence of the proppant stabilize the spacer fluids. The proppant particles include a ceramic, sand, a mineral, a nut shell, gravel, glass, resinous particles, polymeric particles, or a combination thereof. In an embodiment, the proppant particles are selected depending on the particular application of the hydraulic fracturing composition. Examples of the ceramic include an oxide-based ceramic, nitride-based ceramic, carbide-based ceramic, boride-based ceramic, silicide-based ceramic, or a combination thereof. In an embodiment, the oxide-based ceramic is silica ($SiO_2$), titania ($TiO_2$), aluminum oxide, boron oxide, potassium oxide, zirconium oxide, magnesium oxide, calcium oxide, lithium oxide, phosphorous oxide, and/or titanium oxide, or a combination thereof. The oxide-based ceramic, nitride-based ceramic, carbide-based ceramic, boride-based ceramic, or silicide-based ceramic contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like). Exemplary ceramics include zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or a combination thereof.

Examples of suitable sands for the proppant particles include, but are not limited to, Arizona sand, Wisconsin sand, Badger sand, Brady sand, and Ottawa sand. In an embodiment, the proppant particles made of a mineral such as bauxite are sintered to obtain a hard material. In an embodiment, the bauxite or sintered bauxite has a relatively high permeability such as the bauxite material disclosed in U.S. Pat. No. 4,713,203, the content of which is incorporated by reference herein in its entirety.

Naturally occurring proppant particles include nut shells such as walnut, coconut, pecan, almond, ivory nut, brazil nut, and the like; seed shells of fruits such as plum, olive, peach, cherry, apricot, and the like; seed shells of other plants such as maize (e.g., corn cobs or corn kernels); wood materials such as those derived from oak, hickory, walnut, poplar, mahogany, and the like. Such materials are particles formed by crushing, grinding, cutting, chipping, and the like.

The spacer fluids can contain about 0.01 to 500 pounds of the proppant per gallon of the spacer fluids (ppg), preferably about 0.1 to about 100 ppg, more preferably about 1 to about 20 ppg of the proppant.

The cement spacer fluids can further comprise a carrier fluid to carry the quaternary surfactant, the viscosifier, and the proppant to the desired location in the wellbore. The carrier fluid can be fresh water, brine (including seawater), an aqueous acid (for example a mineral acid or an organic acid), an aqueous base, or a combination comprising at least one of the foregoing. It will be appreciated that other polar liquids such as alcohols and glycols, alone or together with water, may be used in the carrier fluid.

The brine can be, for example, seawater, produced water, completion brine, or a combination comprising at least one of the foregoing. The properties of the brine can depend on the identity and components of the brine. Seawater, for example, can contain numerous constituents including sulfate, bromine, and trace metals, beyond typical halide-containing salts. Produced water can be water extracted from a production reservoir (e.g., hydrocarbon reservoir) or produced from an underground reservoir source of fresh water or brackish water. Produced water can also be referred to as reservoir brine and contain components including barium, strontium, and heavy metals. In addition to naturally occurring brines (e.g., seawater and produced water), completion brine can be synthesized from fresh water by addition of various salts for example, KCl, NaCl, $ZnCl_2$, $MgCl_2$, or $CaCl_2$ to increase the density of the brine, such as about 10.6 pounds per gallon of $CaCl_2$ brine. Completion brines typically provide a hydrostatic pressure optimized to counter the reservoir pressures downhole. The above brines can be modified to include one or more additional salts. The additional salts included in the brine can be NaCl, KCl, NaBr, $MgCl_2$, $CaCl_2$, $CaBr_2$, $ZnBr_2$, $NH_4Cl$, sodium formate, cesium formate, and combinations comprising at least one of the foregoing. The salt can be present in the brine in an amount of about 0.5 to about 50 weight percent (wt. %), specifically about 1 to about 40 wt. %, and more specifically about 1 to about 25 wt. %, based on the weight of the carrier fluid.

The cement spacer fluids can further comprise other components known for use in cement spacers, for example a viscosifier crosslinker, a pH control agent, a surfactant, a weighting agent, a lubricant, a fluid loss agent, a clay stabilizer, a biocide, an acid, a corrosion inhibitor, a friction reducer, an oxygen scavenger, a gel stabilizer, or a combination comprising at least one of the foregoing. These additional components are selected to avoid imparting unfavorable characteristics to the cement spacers, to avoid damage to equipment in contact with the compositions, and to avoid damaging the wellbore or subterranean formation.

In an embodiment, a crosslinker for the viscosifier can be present, for example a borate, titanate, zirconate, aluminate, or chromate crosslinker, or a combination comprising at least one of the foregoing.

The pH-adjusting agent is an organic or inorganic base, organic or inorganic acid, or a buffer, which is any appropriate combination of acid and conjugate base. Exemplary inorganic bases include those represented by MOH, where M is a metal from group 1 or 2 of the periodic table, a transition metal, or a metal or metalloid from group 13, 14, or 15; carbonate salt; bicarbonate salt; or a combination comprising at least one of the foregoing. Exemplary inorganic acids include HCl, HBr, fluoroboric acid, sulfuric acid, nitric acid, acetic acid, formic acid, methanesulfonic acid, propionic acid, chloroacetic or dichloroacetic acid, citric acid, glycolic acid, lactic acid, or a combination comprising at least one of the foregoing. Specific examples of pH control agents, particularly those used in combination with borate crosslinking agents include alkaline metal and alkaline earth metal hydroxides and carbonates such as sodium hydroxide and sodium carbonate, metal oxides such as magnesium oxide, sodium sesquicarbonate, and amines such as hydroxyalkyl amines, anilines, pyridines, pyrimidines, quinolines, and pyrrolidines, and carboxylates such as acetates and oxalates.

Weighting agents are high-specific gravity and finely divided solid materials used to increase density, for example silica flour, sand, fly ash, calcium carbonate, barite, hematite, ilemite, siderite, and the like. Preferred weighting agents are sand and silica flour.

Surfactants can increase the compatibility of the cement spacer fluids, the cement slurry, or the drilling fluid. The surfactant can be anionic, cationic, zwitterionic, or non-ionic. Other useful surfactants include those having poly (alkylene glycol) side chains, fatty acids, or fluorinated groups such as perfluorinated $C_{1-4}$ sulfonic acids grafted to the polymer backbone. Polymer backbones include those based on a polyester, a poly(meth)acrylate, a polystyrene, a poly(styrene-(meth)acrylate), a polycarbonate, a polyamide, a polyimide, a polyurethane, a polyvinyl alcohol, or a copolymer comprising at least one of these polymeric backbones.

Lubricants minimize friction and include materials such as a polyacrylamide, petroleum distillate, hydrotreated light petroleum distillate, a short chain alcohol (e.g., methanol), or polyol (e.g., ethylene glycol or glycerol polyisobutyl methacrylate, polymethyl methacrylate, polyisobutylene, guar, guar derivatives, a polysaccharide such as cellulose and starch, and polyethylene oxide, or a combination comprising at least one of the foregoing can be used.

Fluid-loss control agents are usually water-soluble polymers such as guar gums, poly(ethyleneimine), cellulose derivatives, and polystyrene sulfonate. In some embodiments, the same polymer functions as both a viscosifier and a fluid-loss control agent.

The clay stabilizer prevents the clay downhole from swelling under contact with the cement spacer or applied fracturing pressure and can be, for example, a quaternary amine, a brine (e.g., KCl brine), choline chloride, tetramethyl ammonium chloride, and the like.

A biocide prevents injection of a microbe (e.g., bacteria) downhole by eliminating or reducing bacteria in the cement spacer, thus reducing production of, e.g., sour gas.

The various properties of the cement spacer fluids can be varied and adjusted according to well control and compatibility parameters associated with the particular wellbore fluid and the cement slurry with which it is associated. Advantageously, the cement spacer fluids form a gel, before, during, or after they are injected into the wellbore. The viscosity of the spacer fluids can be varied over a wide range such as an apparent viscosity (AV) from about 0 to about 600 centiPoise (cP) or about 0.01 to about 300 cP when measured with a benchtop viscometer such as an Ofite M900 rheometer at 23° C. at 300 revolutions per minute (rpm) and performed according to American Petroleum Institute standard API RP-39.

The density of the cement spacer fluid can vary over a wide range. In an embodiment, the cement spacer fluid has a density of about 5 ppg to about 22 ppg, specifically about 8.5 ppg to about 18 ppg. In an embodiment, the spacer fluids are lighter than the preceding fluids.

The cement spacer fluids can be premixed or are injected without mixing, e.g., injected "on the fly" where the components are combined as the cement spacers are being injected downhole. The order of addition can be varied and the time of injecting each component is the same or different.

In general, a cement spacer fluid is first injected into a wellbore. Then a cement slurry is injected (optionally with a "lead slurry" or a "tail slurry"), and allowed to set. The cement spacer fluid is used to hold the cement plug where it is placed and to prevent density swapping of the cement slurry with a wellbore fluid after slurry placement. Although usually the cement spacer fluid is injected before the cement slurry, but it is possible to also use cement spacer fluid to isolate the cement slurry from following wellbore fluids such as drilling fluids, alone or with another isolation fluid. Thus, in another embodiment the method includes injecting a first cement spacer fluid into the wellbore. A cement slurry is then injected into the wellbore, followed by injecting a second cement spacer fluid. As the first and second cement spacer fluid contact the cement slurry, on either side, the slurry is sandwiched by the first and the second cement spacer fluids. The first and second cement spacer fluids can be different or the same.

The wellbore fluids can be a drilling fluid. It will be appreciated that as used herein, the term "drilling fluid" also encompasses "drill-in fluids" and "completion fluids". A drilling fluid, also called drilling mud, is a complex heterogeneous fluid. Drilling fluids are typically classified according to their base fluid. In water-based muds (WBM), solid particles are suspended in fresh water or brine. If present, oil can be emulsified in the water. Nonetheless, the water is the continuous phase. Oil-based muds (OBM) are the opposite or inverse. Solid particles are suspended in oil, and water or brine is emulsified in the oil and therefore the oil is the continuous phase. The oil in the oil-in-water emulsions or oil-based muds may comprise any oil including, but not limited to, a diesel oil; a paraffin oil; a vegetable oil; a soybean oil; a mineral oil; an aliphatic solvent, an aromatic solvent; or a synthetic oil; or a combination comprising at least one of the foregoing.

The cement slurry can include any cementitious material that sets and hardens by reaction with water, and is suitable for forming a set cement downhole, including mortars and concretes. Suitable hydraulic cements, including mortars and concretes, include those typically employed in a wellbore environment, for example those comprising calcium, aluminum, silicon, oxygen, or sulfur. Such hydraulic cements include, but are not limited to, Portland cements, pozzolana cements, gypsum cements, high alumina content cements, silica cements, and high alkalinity cements. Portland cements are particularly useful. In some embodiments, the Portland cements that are suited for use are classified as Class A, B, C, G, and H cements according to American Petroleum Institute, API Specification for Materials and Testing for Well Cements. The cements as used herein encompass various concretes by the further addition of aggregates, such as a coarse aggregate made of gravel or crushed rocks such as chert, quartzite, granite, or a fine aggregate such as sand or crushed sand.

The cement slurries can further comprise other components known for use in cementing, for example an accelerator to reduce setting time, a setting retardant to extend setting time, a fluid loss control agent, an extender to lower density, a foaming agent to reduce density, a weighting agent to increase density, a dispersant to reduce viscosity, other fluid loss control agents, thixotropic agents, a bridging agent (e.g., gilsonite or cellophane flakes), or a combination comprising at least one of the foregoing.

The cement slurries are pumpable. A pumpable cement slurry can have a viscosity lower than 1000 mPa-s at a shear rate of 100 s$^{-1}$. The cement slurries can be a low-density cement slurry or a high-density cement slurry. While the density of a low-density cement slurry such as a scavenger can vary widely depending on downhole conditions, such densities can include about 5 to about 12 pounds per gallon (ppg) when foamed. When unfoamed the density of a scavenger or low-density cement slurry can vary with such densities between about 9 up to about 15 pounds per gallon, or about 10 to about 14 pounds per gallons, or about 11 up to about 13 pounds per gallon. The high density cement slurries can have a density of about 15 to about 25 pounds per gallon.

The cement slurries can be used to form downhole components, including various casings, seals, plugs, packings, liners, and the like. In an embodiment the component is a plug, including a temporary cement plug, permanent cement plug, or a whipstock cement plug, The whipstock plug can be used to kick off from a vertical wellbore when a directional change in drilling is desired.

Use of the cement spacer fluids as disclosed herein provides a number of benefits. The compositions are stable at high wellbore temperatures. In one benefit, the cement spacer fluids suppress or minimize mixing and remixing of drilling fluid and cement slurries, fluid density swapping, and drilling mud contamination to the leading edge of the cement slurry. Another benefit is enhanced segregation performance with respect to separating wellbore fluids, resulting in streamlined and easier placement of the cement plug at its intended place in the wellbore. Additionally, the methods/compositions disclosed herein prevent or minimize the risk of cement plug set-up failures. Thus, the methods and spacer fluid compositions beneficially improve the overall quality of plug cementing operations.

EXAMPLES

Fluids A, B, and C were made. For fluid A, 3 grams of diutan gum was mixed with 300 grams of water. For fluid B, 3 grams of diutan and 100 grams of sand were mixed with 300 grams of water. To make fluid C, 3 grams of diutan, 100 grams of sand, and 16.5 grams of a quaternary surfactant (Clay Master-5C available from Baker Hughes, a GE company, LLC) were mixed with 300 grams of water. The calculated density in ppg of fluid C is 11.5. The viscosities of fluids A-C were measured at room temperature (23° C.) with a benchtop viscometer. The results are shown in Table 1. As shown in Table 1, fluid C has a higher viscosity than that of fluid A and fluid B.

TABLE 1

| RPM | Fluid A Viscosity (cP) | | Fluid B Viscosity (cP) | | Fluid C Viscosity (cP) | |
|---|---|---|---|---|---|---|
| | Up | Down | Up | Down | Up | Down |
| 3 | 36 | 40 | 52 | 55 | 62 | 77 |
| 6 | 40 | 44 | 59 | 58 | 65 | 81 |
| 10 | 44 | 47 | 62 | 61 | 75 | 84 |
| 20 | 50 | 52 | 67 | 67 | 80 | 90 |
| 30 | 55 | 55 | 70 | 70 | 86 | 93 |
| 60 | 61 | 59 | 76 | 76 | 98 | 100 |
| 100 | 64 | 64 | 80 | 80 | 105 | 106 |
| 200 | 68 | 68 | 89 | 90 | 116 | 118 |
| 300 | 72 | — | 96 | — | 126 | — |

Approximately 200 ml of 13.6 ppg water-based mud (WBM) was poured into a 1,000 ml cylinder. Approximately 200 ml of 11.6 ppg fluid C was poured on top of WMB. Then approximately 200 ml of 16.5 ppg cement slurry was poured on top of fluid C. The cylinder was placed at 450 and 900 angles. About a 2% fluid swap was seem but only at the top of the cement column, which shows the cement spacer fluid as disclosed herein is effective to minimize fluid swap between the cement slurry and the WBM. Similar results were obtained when a settling tube was first charged with 50 ml of the WBM, then 100 ml of the fluid C, and finally 50 ml of the cement slurry. In contrast, when fluid C was not used, significant mixing between the WBM and cement slurry was observed.

Set forth are various embodiments of the disclosure.

Embodiment 1

A method of cementing a wellbore penetrating a subterranean formation, the method comprising: injecting into the wellbore a cement spacer fluid comprising a carrier fluid, a quaternary surfactant, a viscosifier, and a proppant; injecting a cement slurry into the wellbore; and allowing the cement slurry to set.

Embodiment 2

The method as in any prior embodiment, wherein injecting the cement slurry is subsequent to injecting the cement spacer fluid.

Embodiment 3

The method as in any prior embodiment, wherein the cement spacer fluid forms a gel after injected into the wellbore.

Embodiment 4

The method as in any prior embodiment, wherein the cement spacer fluid prevents density swapping between the cement slurry and a wellbore fluid.

Embodiment 5

The method as in any prior embodiment, wherein the cement spacer fluid comprises about 30 to about 100 wt % of the carrier fluid, about 0.05 to about 10 wt % of the quaternary surfactant, about 0.05 to about 10 wt % of the viscosifier, and about 1 to about 65 wt % of the proppant, each based on the weight of water in the cement spacer fluid.

Embodiment 6

The method as in any prior embodiment, wherein the carrier fluid is water or a brine.

Embodiment 7

The method as in any prior embodiment, wherein the quaternary surfactant has a cation of $R_1 R_2 R_3 R_4 N^+$ and an anion, wherein $R_1$, $R_2$, $R_3$, and $R_4$ are each independently a straight or branched $C_{1-30}$ alkyl group, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, or a polyoxyalkylene group; and the anion comprises a halide, a perchlorate, a thiocyanate, a cyanate, a carboxylate, an alkyl sulfate, an alkyl sulfonate, $PF_6^-$, $AsF_6^-$, $SbF_6^-$, $NO_2^-$, $NO_3^-$, $SO_4^-$, or $BX_4^-$, wherein X is a halide.

Embodiment 8

The method as in any prior embodiment, wherein $R_1$, $R_2$, $R_3$, and $R_4$ are each independently a straight or branched $C_{1-20}$ alkyl group or a $C_{1-20}$ hydroxyalkyl group.

Embodiment 9

The method as in any prior embodiment, wherein at least one of $R_1$, $R_2$, $R_3$, and $R_4$ is a $C_{1-5}$ hydroxyalkyl group.

Embodiment 10

The method as in any prior embodiment, wherein the cation is N,N,N-trimethylethanolammonium.

Embodiment 11

The method as in any prior embodiment, wherein the viscosifier comprises guar gums, guar derivatives, hydratable polysaccharides, xanthan gum, galactomannan gums, glucomannan gums, cellulose, cellulose derivatives, poly((meth)acrylic acid)s, poly((meth)acrylamides), copolymers of (meth)acrylic acid and (meth)acrylamide, Cl-8 alkyl poly(meth)acrylates, clays, or a combination comprising at least one of the foregoing viscosifiers.

Embodiment 12

The method as in any prior embodiment, wherein the wellbore fluid is a drilling fluid.

Embodiment 13

The method as in any prior embodiment, further comprising injecting the wellbore fluid prior to injecting the cement spacer fluid.

Embodiment 14

The method as in any prior embodiment, wherein the cement slurry sets forming a cement plug.

Embodiment 15

A cement spacer fluid comprising: about 30 to about 100 wt % of an aqueous carrier comprising water; about 0.05 to about 10 wt % of a quaternary surfactant having a cation of $R_1 R_2 R_3 R_4 N^+$ and an anion, wherein $R_1$, $R_2$, $R_3$, and $R_4$ are each independently a straight or branched $C_{1-30}$ alkyl group, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, or a polyoxyalkylene group; and the anion comprises a halide, a perchlorate, a thiocyanate, a cyanate, a carboxylate, an alkyl sulfate, an alkyl sulfonate, $PF_6^-$, $AsF_6^-$, $SbF_6^-$, $NO_2^-$, $NO_3^-$, $SO_4^-$, or $BX_4^-$, X being a halide; about 0.05 to about 10 wt % of a viscosifier; and about 1 to about 65 wt % of a proppant, each based on the weight of water in the cement spacer fluid.

Embodiment 16

The cement spacer fluid as in any prior embodiment, wherein $R_1$, $R_2$, $R_3$, and $R_4$ are each independently a straight or branched $C_{1-20}$ alkyl group or a $C_{1-20}$ hydroxyalkyl group.

Embodiment 17

The cement spacer fluid as in any prior embodiment, wherein at least one of $R_1$, $R_2$, $R_3$, and $R_4$ is a $C_{1-5}$ hydroxyalkyl group.

Embodiment 18

The cement spacer fluid as in any prior embodiment, wherein the cation is N,N,N-trimethylethanolammonium.

Embodiment 19

The cement spacer fluid as in any prior embodiment, wherein the viscosifier comprises guar gums, guar derivatives, hydratable polysaccharides, xanthan gum, galactomannan gums, glucomannan gums, cellulose, cellulose derivatives, poly((meth)acrylic acid)s, poly((meth)acrylamides), copolymers of (meth)acrylic acid and (meth)acrylamide, $C_{1-8}$ alkyl poly(meth)acrylates, or clays or a combination comprising at least one of the foregoing viscosifiers.

All ranges disclosed herein are inclusive of the endpoints, and the endpoints are independently combinable with each other. As used herein, "combination" is inclusive of blends, mixtures, alloys, reaction products, and the like. The size of the particles refers to the largest dimension of the particles and can be determined by high resolution electron or atomic force microscope technology. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

The invention claimed is:
1. A method of cementing a wellbore penetrating a subterranean formation, the method comprising:
   injecting into the wellbore a cement spacer fluid comprising a carrier fluid, a quaternary surfactant, a viscosifier, and a proppant;
   injecting a cement slurry into the wellbore; and
   allowing the cement slurry to set,
   wherein the carrier fluid comprises water;

the proppant comprises ceramic particles, sand, a nut shell, gravel, glass, or a combination comprising at least one of the foregoing;

the quaternary surfactant has a cation of $R_1 R_2 R_3 R_4 N^+$ and an anion, wherein $R_1$, $R_2$, $R_3$ and $R_4$ are each independently a straight or branched $C_{1-30}$ alkyl group, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, or a polyoxyalkylene group; and the anion comprises a halide, a perchlorate, a thiocyanate, a cyanate, a carboxylate, an alkyl sulfate, an alkyl sulfonate, $PF_6^-$, $AsF_6^-$, $SbF_6^-$, $NO_2^-$, $NO_3^-$, $SO_4^-$, or $BX_4^-$, wherein X is a halide;

the viscosifier comprises guar gums, guar derivatives, hydratable polysaccharides, xanthan gum, galactomannan gums, glucomannan gums, cellulose, cellulose derivatives, poly((meth)acrylic acid)s, poly((meth)acrylamides), copolymers of (meth)acrylic acid and (meth)acrylamide, C1-8 alkyl poly(meth)acrylates, clays, or a combination comprising at least one of the foregoing viscosifiers; and the cement spacer fluid comprises about 30 to about 100 wt % of the carrier fluid, about 0.05 to about 10 wt % of the quaternary surfactant, about 0.05 to about 10 wt % of the viscosifier, and about 1 to about 65 wt % of the proppant, each based on the weight of water in the cement spacer fluid.

2. The method of claim 1, wherein injecting the cement slurry is subsequent to injecting the cement spacer fluid.

3. The method of claim 1, wherein the cement spacer fluid forms a gel after injected into the wellbore.

4. The method of claim 1, wherein the cement spacer fluid prevent mixing of the cement slurry with a wellbore fluid.

5. The method of claim 4, wherein the wellbore fluid is a drilling fluid.

6. The method of claim 4, further comprising injecting the wellbore fluid prior to injecting the cement spacer fluid.

7. The method of claim 1, wherein the carrier fluid is water or a brine.

8. The method of claim 1, wherein $R_1$, $R_2$, $R_3$, and $R_4$ are each independently a straight or branched $C_{1-20}$ alkyl group or a $C_{1-20}$ hydroxyalkyl group.

9. The method of claim 8, wherein at least one of $R_1$, $R_2$, $R_3$, and R4 is a $C_{1-5}$ hydroxyalkyl group.

10. The method of claim 1, wherein the cation is N,N,N-trimethylethanolammonium.

11. The method of claim 1, wherein the cement slurry sets forming a cement plug.

12. The method of claim 1, wherein the viscosifier comprises dilutan.

13. A cement spacer fluid comprising:
about 30 to about 100 wt % of an aqueous carrier comprising water;
about 0.05 to about 10 wt % of a quaternary surfactant having a cation of $R_1 R_2 R_3 R_4 N^+$ and an anion, wherein $R_1$, $R_2$, $R_3$, and $R_4$ are each independently a straight or branched $C_{1-30}$ alkyl group, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, or a polyoxyalkylene group; and the anion comprises a halide, a perchlorate, a thiocyanate, a cyanate, a carboxylate, an alkyl sulfate, an alkyl sulfonate, $PF_6^-$, $AsF_6^-$, $SbF_6^-$, $NO_2^-$, $NO_3^-$, $SO_4^-$, or $BX_4^-$, X being a halide;
about 0.05 to about 10 wt % of a viscosifier comprising guar gums, guar derivatives, hydratable polysaccharides, xanthan gum, galactomannan gums, glucomannan gums, cellulose, cellulose derivatives, poly((meth)acrylic acid)s, poly((meth)acrylamides), copolymers of (meth)acrylic acid and (meth)acrylamide, C1-8 alkyl poly(meth)acrylates, or clays or a combination comprising at least one of the foregoing viscosifiers; and
about 1 to about 65 wt % of a proppant,
each based on the weight of water in the cement spacer fluid, the proppant comprising ceramic particles, sand, a nut shell, gravel, glass, or a combination comprising at least one of the foregoing.

14. The cement spacer fluid of claim 13, wherein $R_1$, $R_2$, $R_3$, and $R_4$ are each independently a straight or branched $C_{1-20}$ alkyl group or a $C_{1-20}$ hydroxyalkyl group.

15. The cement spacer fluid of claim 13, wherein at least one of $R_1$, $R_2$, $R_3$, and $R_4$ is a $C_{1-5}$ hydroxyalkyl group.

16. The cement spacer fluid of claim 13, wherein the cation is N,N,N-trimethylethanolammonium.

17. The cement spacer fluid of claim 13, wherein at least one of $R_1$, $R_2$, $R_3$, and R4 is a $C_{1-5}$ hydroxyalkyl group, and the cation is N,N,N-trimethylethanolammonium.

18. The cement spacer fluid of claim 13, wherein the viscosifier comprises dilutan.

* * * * *